United States Patent [19]

Tanaka

[11] Patent Number: 5,187,751

[45] Date of Patent: Feb. 16, 1993

[54] CLUSTERING SYSTEM FOR OPTICAL CHARACTER READER

[75] Inventor: Hideaki Tanaka, Daito, Japan

[73] Assignee: Sharp Kabushiki Kaisha, Osaka, Japan

[21] Appl. No.: 733,041

[22] Filed: Jul. 22, 1991

[30] Foreign Application Priority Data

Jul. 24, 1990 [JP] Japan .................................. 2-196749

[51] Int. Cl. ............................................... G06K 9/62
[52] U.S. Cl. ........................................ 382/36; 382/14; 382/39
[58] Field of Search ..................... 382/14, 15, 36, 34, 382/30, 21, 48; 345/20, 21

[56] References Cited

U.S. PATENT DOCUMENTS

| | | | |
|---|---|---|---|
| 3,626,368 | 12/1971 | Lee ........................................ | 382/15 |
| 3,727,193 | 4/1973 | Bolie ...................................... | 382/39 |
| 4,731,859 | 3/1988 | Holter et al. ........................ | 382/36 |
| 4,752,957 | 6/1988 | Maeda .................................. | 382/36 |
| 4,977,603 | 12/1990 | Irie et al. .............................. | 382/36 |
| 5,060,277 | 10/1991 | Bokser .................................. | 382/14 |
| 5,075,896 | 12/1991 | Wilcox et al. ........................ | 382/39 |
| 5,142,593 | 8/1992 | Kasano .................................. | 382/36 |

*Primary Examiner*—Joseph Mancuso

*Attorney, Agent, or Firm*—Nixon & Vanderhye

[57] ABSTRACT

In a clustering system for an optical character reader, feature vectors of character image data to be classified are stored in a first memory. The number of classes, and representative vectors for the respective classes which are previously provided are stored in a second memory. Values of the cosine of each of the feature vectors stored in the first memory and each of the representative vectors stored in the second memory are calculated by a cosine calculating unit. Then, each of the feature vectors is assigned to one of the classes from which the largest cosine value is calculated, and the largest cosine value is stored into a third memory. For each of the thus processed classes, a total sum vector calculating unit calculates a total sum vector from the feature vectors which belong to the respective class, using the largest cosine values for the respective feature vectors stored in the third memory as weights. The resulting weighted total sum vector is stored into the second memory as a new representative vector for the class so as to update the contents of the second memory. The cosine calculating unit, and total sum vector calculating unit are controlled to operate repeatedly, until a convergence judging unit judges that any feature vectors are not exchanged between the classes during the classification.

4 Claims, 2 Drawing Sheets

CLUSTERING SYSTEM FOR OPTICAL CHARACTER READER

BACKGROUND OF THE INVENTION

1. Field of the Invention

The invention relates to a clustering system, and more particularly to a clustering system which is useful in classifying character image data into a predetermined number of font classes in an optical character reader (hereinafter, referred to as "an OCR").

2. Description of the Prior Art

In an OCR, generally, character image data are clustered by the K-means method or another method which is useful in the multivariate analysis. These methods are roughly classified into two types. One is a method in which the number of classes and representative vectors of respective classes are input as initial values. The other is a method in which the number of classes and representative vectors are automatically obtained.

Among these methods, the K-means method in which initial values are to be input is most frequently used. In the K-means method, distances between each of feature vectors of character image data and each of representative vectors input as initial values is calculated. For each of the feature vectors, the representative vector which is closest to the respective feature vector is obtained from the result of this distance calculation. Then, each of the feature vectors is assigned to a class to which the closest representative vector belongs. Thereafter, an average vector is calculated for each of the classes, and the average vector is set as a new representative vector of the class. The distance between each of feature vectors and each of new representative vectors is calculated, and the feature vectors are classified again. The calculation of the distance between each of the feature vectors and each of the new representative vectors, and the classification of the feature vectors is repeated until any of the feature vectors is not exchanged between the classes as a result of the classification (i.e., until the convergence is obtained).

In the K-means method, however, an average vector for one class is obtained from the feature vectors which are assigned to the class, on the basis of the distance calculation with the representative vectors, and this average vector is used as a new representative vector. If an irregular vector is accidentally input or assigned to a class, therefore, the average vector (i.e., the new representative vector) of the class shifts. As a result, in the next classification, another irregular vector may be assigned to the class. This causes a problem in that, after the convergence is obtained, an initial representative vector (an initial value) does not exist for the class.

The clustering process using font names as the unit of classification can be effectively applied to some kinds of characters which have a small number of fonts, such as Japanese characters (in printing Japanese characters, a small number of fonts such as Ming, Gothic and textbook types are usually employed). In contrast, alphanumeric characters have a huge number of fonts (1,000 or more), and handwritten characters have countless fonts (the number of which corresponds to the number of writers). Therefore, it is difficult to cluster alphanumeric or handwritten characters by using font names. Even in a process of clustering such characters, however, one can easily determine in a intuitive manner the number of classes and representative vectors of the respective classes. When printed alphanumeric characters are to be clustered, for example, one can define a class in which the representative vector is an ordinary character used in ordinary books, and another class in which the representative vector is a fat character (e.g., a bold type one). When handwritten characters are to be clustered, a class in which the representative vector is a left-inclined "1", another class in which the representative vector is a right-inclined "1", etc. may be defined.

Even though the number of classes and the initial values of representative vectors are intuitively determined, as long as the K-means method is used, there still arises a problem in that the initial value of the representative vector for a class does not exist after converged. Therefore, a person who determines the initial value will find the disadvantage of the conventional method. Furthermore, even if the representative vectors for respective classes obtained after the convergence are registered as standard fonts, and the recognition process is performed using these standard fonts, the improvement of the recognition rate cannot be attained.

SUMMARY OF THE INVENTION

The clustering system of this invention, which overcomes the above-discussed and numerous other disadvantages and deficiencies of the prior art, classifies data into a predetermined number of classes, and comprises: first memory means for storing feature vectors of said data; second memory means for storing said predetermined number and representative vectors of said classes, said representative vectors being previously provided; cosine calculating means for calculating the cosine of each of said feature vectors stored in said first memory means and each of said representative vectors stored in said second memory means; classification means for assigning each of said feature vectors into one of said classes which indicates the largest cosine value; third memory means for storing said largest cosine value for each of said feature vectors; total sum vector calculating means for calculating, for each of said classes, a total sum vector from feature vectors of one of said classes, using a weight which is the largest cosine value for each of said feature vectors stored in said third memory means, and for storing said weighted total sum vector into said second means, thereby updating the contents of said second memory means; and convergence judging means for controlling said cosine calculating means, classification means and total sum vector calculating means to operate repeatedly, until no feature vectors are exchanged between the classes as a result of the classification by said classification means.

In another aspect of the invention, the optical character reader according to the invention comprises a clustering system for classifying character image data into a predetermined number of font classes, said clustering system comprising: first memory means for storing feature vectors of said character image data; second memory means for storing said predetermined number and representative vectors of said font classes, said representative vectors being previously provided; cosine calculating means for calculating the cosine of each of said feature vectors stored in said first memory means and each of said representative vectors stored in said second memory means; classification means for assigning each of said feature vectors into one of said classes which indicates the largest cosine value; third memory means for storing said largest cosine value for each of said feature vectors; total sum vector calculating means for calculating, for each of said classes, a total sum vector from feature vectors of one of said classes, using a weight which is the largest cosine value for each of said feature vectors stored in said third memory means, and for storing said weighted total sum vector into said second means, thereby updating the contents of said second memory means; and convergence judging means for controlling said cosine calculating means, classification means and total sum vector calculating means to operate repeatedly, until no feature vectors are exchanged between the classes as a result of the classification by said classification means.

Preferably, each of said representative vectors of said font classes is indicative of the feature of the font corresponding to the respective one of said font classes.

Preferably, said font classes are used in a dictionary for character recognition.

Thus, the invention described herein makes possible the objectives of:

(1) providing a clustering system by which a novel method of generating representative vectors can be provided;

(2) providing a clustering system in which the shift of a representative vector caused by the existence of an irregular feature vector can be suppressed;

(3) providing a clustering system in which initial representative vectors can surely exist in respective classes after the convergence;

(4) providing a clustering system which can obtain representative vectors by which the process of recognizing character image data can be performed with a high recognition rate; and (5) providing an optical character reader which can recognize image data of characters having many fonts, with a high recognition rate.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
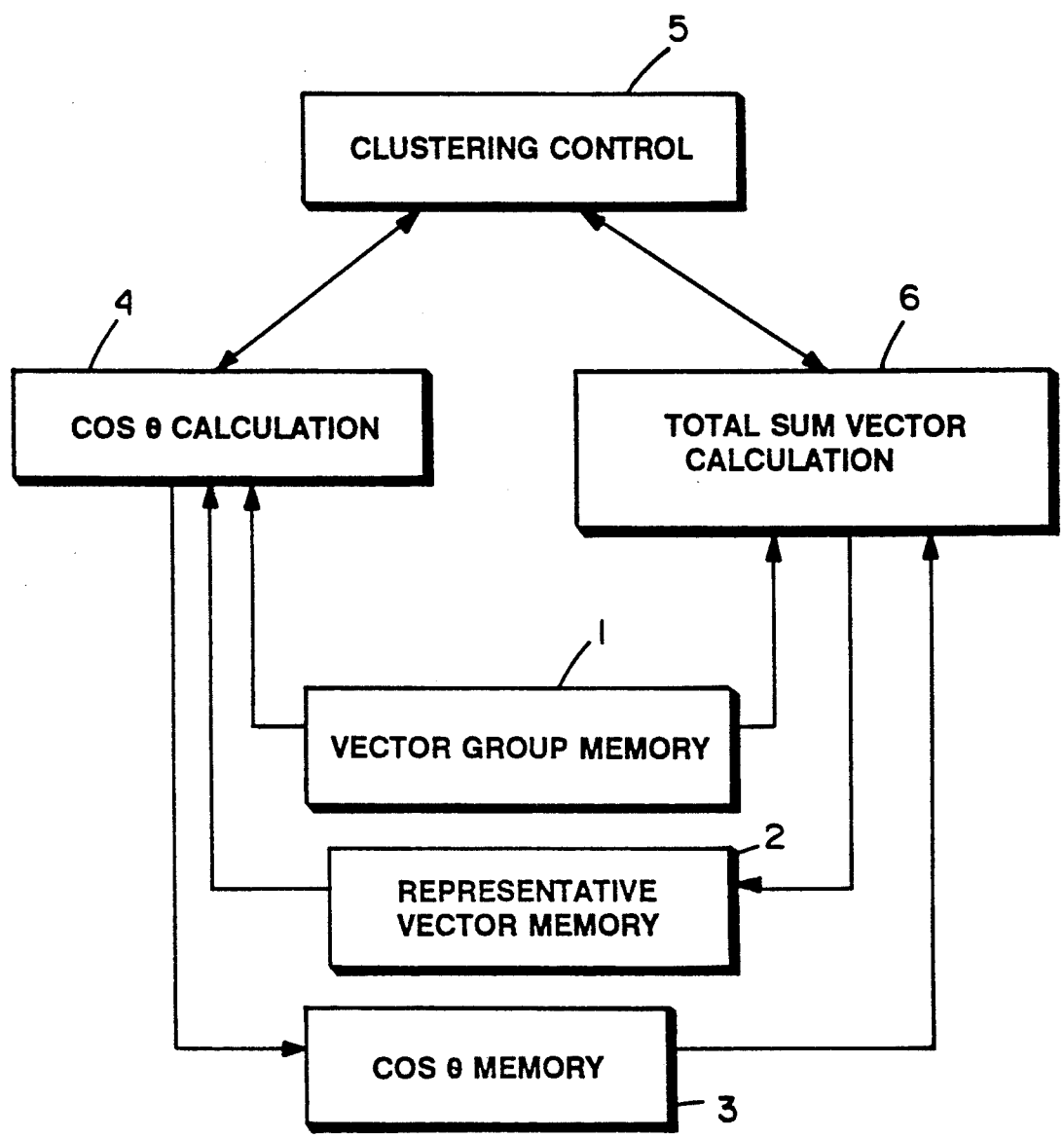
FIG. 1 is a schematic block diagram showing an OCR of one embodiment which utilizes a clustering system according to the invention.

FIG. 1 illustrates an embodiment of the invention which is used in an OCR. This OCR reads images of characters, and classifies the character image data into a predetermined number of font classes in order to prepare a dictionary. The OCR comprises a vector group memory (the first memory means) 1, a representative vector memory (the second memory means) 2, a cos $\theta$ memory (the third memory means) 3, a cos $\theta$ calculating unit (the cosine calculating means) 4, and a clustering control unit (the convergence judging means) 5. The vector group memory 1 stores a group of feature vectors of the character image data to be classified. The representative vector memory 2 stores the number of font classes and representative vectors indicating the character features of respective font classes. The number of the font classes and the representative vectors are previously determined. The cos $\theta$ calculating unit 4 calculates the cosine of each of the feature vectors stored in the vector group memory 1 and each of the representative vectors stored in the representative vector memory 2. The clustering control unit 5 assigns each feature vector into a class which indicates the largest cosine calculated in the cos $\theta$ calculating unit 4, and stores the value of the largest cosine for each of the feature vectors into the cos $\theta$ memory 3.

The OCR further comprises a total sum vector calculating unit 6. The total sum vector calculating unit 6 calculates a total sum vector for each of the classes classified by the clustering control unit 5, from the feature vectors which belong to the respective class. In this calculation, the largest cosine value for the respective feature vector stored in the cos $\theta$ memory 3 is used as a weight. The weighted total sum vector is stored as a new representative vector for the respective class into the representative vector memory 2, thereby updating the contents of the representative vector memory 2. The clustering control unit 5 judges whether or not, in the classification by the clustering control unit itself, any feature vector is not exchanged between the classes. Until judging that any feature vectors are not exchanged, the clustering control unit 5 controls the cos $\theta$ calculating unit 4 and the total sum vector calculating unit 6 to operate repeatedly, and performs its classification repeatedly.

The clustering operation in the OCR with the above-described configuration will be described with reference to FIG. 2. For the sake of simplification, it is assumed that, with respect to one character, p feature vectors $\vec{X}_1, \vec{X}_2, \ldots, \vec{X}_p$ are stored in the vector group memory 1, and two representative vectors $\vec{F}$ and $\vec{G}$ of the respective classes f and g are stored in the representative vector memory 2 (steps S1 and S2). The representative vectors $\vec{F}$ and $\vec{G}$ are selected from the p feature vectors as $\vec{F} = \vec{X}_i = (X_{i1}, X_{i2}, \ldots, X_{in})$ and $\vec{G} = \vec{X}_j = (X_{j1}, X_{j2}, \ldots, X_{jn})$, respectively:

where
$\vec{X}_1 = (X_{11}, X_{12}, \ldots, X_{1n})$,
$\vec{X}_2 = (X_{21}, X_{22}, \ldots, X_{2n})$,
$\ldots$
$\vec{X}_p = (X_{p1}, X_{p2}, \ldots, X_{pn})$,
$i \neq j$, and $1 \leq i \leq p$, $1 \leq j \leq p$ The cos $\theta$ calculating unit 4 calculates the cosine of each of the feature vectors $\vec{X}_1$ to $\vec{X}_p$ and either of the representative vectors $\vec{F}$ and $\vec{G}$, using the following equations (step S4):

cosine of $\vec{X}_k$ and $\vec{F}$:
$\cos \theta_{f \times k} = (\vec{F}, \vec{X}_k)/(\|\vec{F}\| \cdot \|\vec{X}_k\|)$
cosine of $\vec{X}_k$ and $\vec{G}$:
$\cos \theta_{g \times k} = (\vec{G}, \vec{X}_k)/(\|\vec{G}\| \cdot \|\vec{X}_k\|)$
where
$k = 1, 2, \ldots, p$ $$(\vec{F}, \vec{X}_k) = \sum_{l=1}^{n} (X_{kl} \cdot X_{il})$$

$$\|\vec{F}\| = \sqrt{\sum_{l=1}^{n} (X_{il} \cdot X_{il})}$$

$$\|\vec{X}_k\| = \sqrt{\sum_{l=1}^{n} (X_{kl} \cdot X_{kl})}$$

$$(\vec{G}, \vec{X}_k) = \sum_{l=1}^{n} (X_{kl} \cdot X_{jl})$$

-continued $$\|\vec{G}\| = \sqrt{\sum_{l=1}^{n} (X_{jl} \cdot X_{jl})}$$

The clustering control unit 5 classifies the feature vectors $\vec{X}_k$ (step S5). In this classification, each of the feature vectors $\vec{X}_k$ is assigned to a class from which a larger cosine is calculated in the cos $\theta$ calculating unit 4. In other words, when cos $\theta_{fxk} \geq$ cos $\theta_{gxk}$, the respective feature vector $\vec{X}_k$ is assigned to the class f, and when cos $\theta_{fxk} <$ cos $\theta_{gxk}$, the feature vector $\vec{X}_k$ is assigned to the class g. The value of largest cos $\theta$ for the respective feature vector, i.e., the larger one of $\omega_{fk} =$ cos $\theta_{fxk}$ and $\omega_{gk} =$ cos $\theta_{gxk}$ is stored into the cos $\theta$ memory 3. As a result, m feature vectors ($1 \leq m < p$) $\vec{X}_1, \vec{X}_2, \ldots, \vec{X}_m$ are assigned to the class f after the classification (here, the subscripts are new ones), and the remaining (p−m) feature vectors are assigned to the class g after the classification. The feature vectors $\vec{X}_1, \vec{X}_2, \ldots, \vec{X}_m$ of the class f and $\omega$ values are as follows:

|  | value of $\omega$ |
|---|---|
| $\vec{X}_1 = (X_{11}, X_{12}, \ldots, X_{1n})$ | $\omega_{f1}$ |
| $\vec{X}_2 = (X_{21}, X_{22}, \ldots, X_{2n})$ | $\omega_{f2}$ |
| $\ldots$ | $\ldots$ |
| $\vec{X}_m = (X_{m1}, X_{m2}, \ldots, X_{mn})$ | $\omega_{fm}$ |

Next, the total sum vector calculating unit 6 calculates a new representative vector $\vec{F}' = (F'_1, F'_2, \ldots, F'_n)$ of the class f. This new representative vector $\vec{F}'$ is obtained as a weighted total sum vector, from the feature vectors which belong to the class f by using the value $\omega_{fl}$ (l = 1, 2, ..., m) stored in the cos $\theta$ memory 3, in accordance with the following expression (step S9):

$$F_k = \sum_{l=1}^{m} \omega_{fl} X_{lk} \; (k = 1, 2, \ldots, n)$$

where,
$\omega_{fl} =$ cos $\theta_{fxk}$ is a weight (cosine of the previous representative vector), and
$0 \leq \omega_{fl} \leq 1$ In this way, elements of the feature vector which are close to the previous representative vector $\vec{F}$ are strengthened, and those of the feature vector which are remote from the previous representative vector $\vec{F}$ are weakened. These elements are summed to produce respective elements of the new representative vector $\vec{F}'$. Therefore, even if an irregular feature vector is accidentally assigned to the class f, the new representative vector $\vec{F}'$ will not be largely shifted from the initial representative vector $\vec{F}$.

The total sum vector calculating unit 6 calculates the new representative vector $\vec{G}'$ of the class g in the same manner as described above. Then, the resulting weighted total sum vectors $\vec{F}'$ and $\vec{G}'$ are stored into the representative vector memory 2 as new representative vectors for the respective classes f and g, thereby updating the contents of the representative vector memory 2.

The clustering control unit 5 controls the cos $\theta$ calculating unit 4 to operate, and performs the classification again using the new representative vectors $\vec{F}'$ and $\vec{G}'$. If, after this reclassification, the result is the same as that obtained in the previous classification (i.e., the feature vectors $\vec{X}_k$ are not exchanged between the classes f and g), the clustering is judged to be converged, and the processing is terminated (step S6). If, after the reclassification, any of the feature vectors is exchanged between the classes f and g (for example, if a feature vector $\vec{X}_a$ which has been assigned to the class g is assigned to the class f as a result of the reclassification), the total sum vector calculating unit 6 is controlled so as to perform the process of obtaining new representative vectors for the class f of (m+1) feature vectors and the class g of (p−m−1) feature vectors. The above-described cos $\theta$ calculation and classification are repeated until the clustering is converged (steps S6 and S9).

Figure 2:
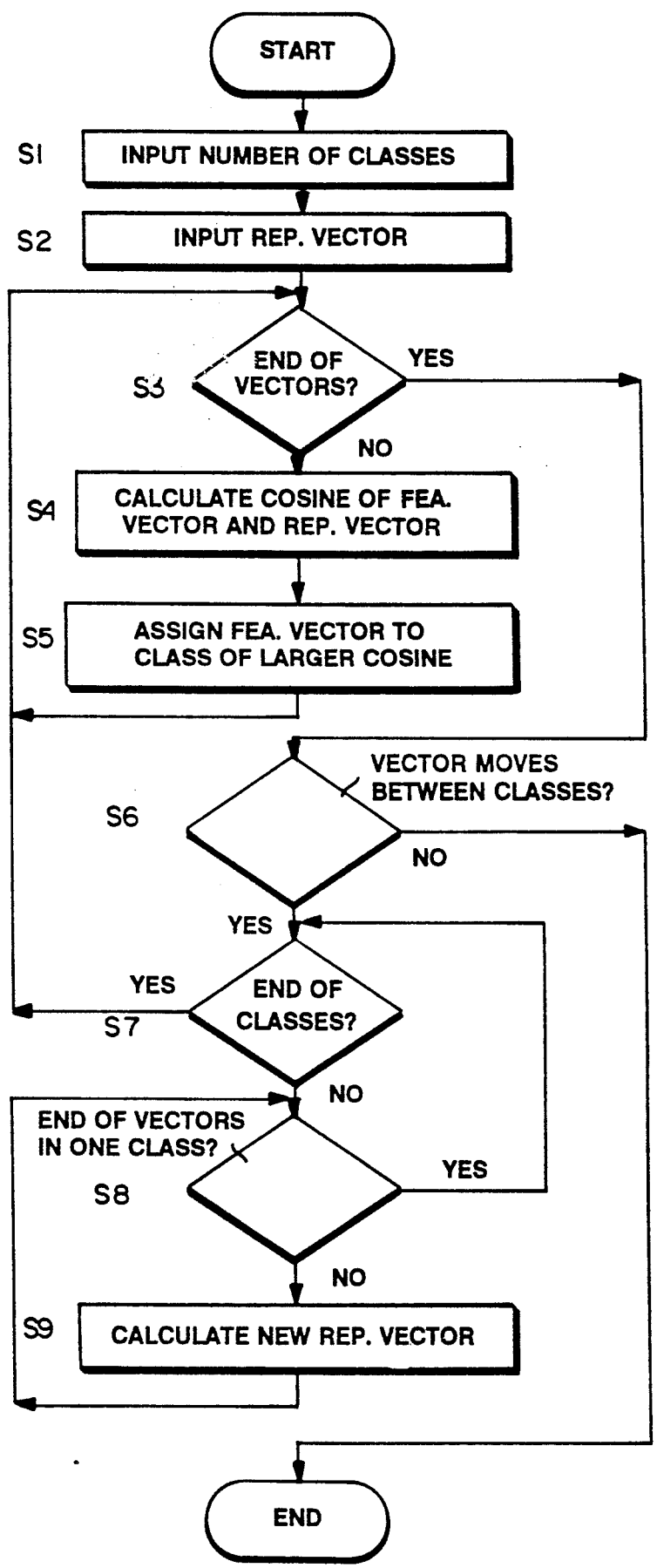
FIG. 2 is a flow chart illustrating the clustering processing in the embodiment of FIG. 1.

In step S3 shown in FIG. 2, it is judged whether or not the process of calculating the cosine of a feature vector and a representative vector by the cos $\theta$ calculating unit 4 has been conducted for all of the feature vectors. In step S7, it is judged whether or not the cos $\theta$ calculations with respect to all of the representative vectors of the classes are completed, and whether or not the vector exchange between all pairs of the classes are checked. In step S8, it is judged whether or not the total sum vector calculating unit 6 finishes the calculation of new representative vectors for the respective classes.

As described above, according to the invention, the new representative vectors $\vec{F}'$ and $\vec{G}'$ of the respective classes f and g are produced as total sum vectors from the feature vectors $\vec{X}l$ which belong to the respective classes. In this process, the values of cos $\theta$ ($\omega_{fl}$, $\omega_{gl}$) of the feature vectors $\vec{X}l$ and the previous representative vectors $\vec{F}$ and $\vec{G}$ are used as weights. Therefore, even if irregular feature vectors are input to the classes, the new representative vectors $\vec{F}'$ and $\vec{G}'$ are not largely shifted from the initially given representative vectors $\vec{F}$ and $\vec{G}$, respectively, so that the initial representative vectors (initial values) surely exist in the classes when the convergence is obtained.

Consequently, according to the invention, the clustering operation can be appropriately performed so as to obtain optimum representative vectors for respective classes. A dictionary for a character or font recognition can be prepared on the basis of these representative vectors. Character image data which is read by an OCR having the above-described system can be subjected to the font recognition process using the thus prepared dictionary. Even if characters having a large number of fonts such as alphanumeric or handwritten characters are to be recognized, character image data can be clustered by the provision of initial values, in the same way as the clustering performed in the units of font names for characters which have a small number of fonts such as Japanese, whereby the recognition rate can be remarkably improved.

According to the invention, the configuration of the means is not restricted to that described above, but may be appropriately modified. The number of the classes is not limited to two, and three or more classes may be used.

As is apparent from the above description, in the clustering system used in the OCR according to the invention, feature vectors of character image data to be classified are stored in the first memory means. The number of classes, and representative vectors for the respective classes which are previously provided are stored in the second memory means. Values of cosine of each of the feature vectors stored in the first memory means and each of the representative vectors stored in the second memory means are calculated by the cosine calculating means. Then, each of the feature vectors is assigned to one of the classes from which the largest cosine value is calculated, and the largest cosine value is stored into the third memory means. For each of the thus processed classes, the total sum vector calculating means calculates a total sum vector from the feature vectors which belong to the respective class, using the largest cosine values for the respective feature vectors stored in the third memory means as weights. The resulting weighted total sum vector is stored into the second memory means as a new representative vector for the class so as to update the contents of the second memory means. The above-mentioned cosine calculating means, classification means and total sum vector calculating means are controlled so as to operate repeatedly, until the convergence judging means judges that any feature vectors are not exchanged between the classes during the classification. Therefore, even if an irregular feature vector has been input into the class, the initial representative vector does not fail to exist when converged, so that the optimum representative vector for the class is obtained by appropriate clustering. When the character data read into the OCR is subjected to font recognition processing based on the thus obtained representative vectors, the recognition rate can be increased for characters which have a large number of fonts such as alphanumeric characters.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A clustering system for classifying data into a predetermined number of classes, comprising:

first memory means for storing feature vectors of said data;

second memory means for storing said predetermined number and representative vectors of said classes, said representative vectors being previously provided;

cosine calculating means for calculating the cosine of each of said feature vectors stored in said first memory means and each of said representative vectors stored in said second memory means;

classification means for assigning each of said feature vectors into one of said classes which indicates the largest cosine value;

third memory means for storing said largest cosine value for each of said feature vectors;

total sum vector calculating means for calculating, for each of said classes, a total sum vector from feature vectors of one of said classes, using a weight which is the largest cosine value for each of said feature vectors stored in said third memory means, and for storing said weighted total sum vector into said second means, thereby updating the contents of said second memory means; and convergence judging means for controlling said cosine calculating means, classification means and total sum vector calculating means to operate repeatedly, until no feature vectors are exchanged between the classes as a result of the classification by said classification means.

2. An optical character reader comprising a clustering system for classifying character image data into a predetermined number of font classes, said clustering system comprising:

first memory means for storing feature vectors of said character image data;

second memory means for storing said predetermined number and representative vectors of said font classes, said representative vectors being previously provided;

cosine calculating means for calculating the cosine of each of said feature vectors stored in said first memory means and each of said representative vectors stored in said second memory means;

classification means for assigning each of said feature vectors into one of said classes which indicates the largest cosine value;

third memory means for storing said largest cosine value for each of said feature vectors;

total sum vector calculating means for calculating, for each of said classes, a total sum vector from feature vectors of one of said classes, using a weight which is the largest cosine value for each of said feature vectors stored in said third memory means, and for storing said weighted total sum vector into said second means, thereby updating the contents of said second memory means; and convergence judging means for controlling said cosine calculating means, classification means and total sum vector calculating means to operate repeatedly, until no feature vectors are exchanged between the classes as a result of the classification by said classification means.

3. An optical character reader according to claim 2, wherein each of said representative vectors of said font classes is indicative of the feature of the font corresponding to the respective one of said font classes.

4. An optical character reader according to claim 2, wherein said font classes are used in a dictionary for character recognition.

* * * * *